Figure 1:
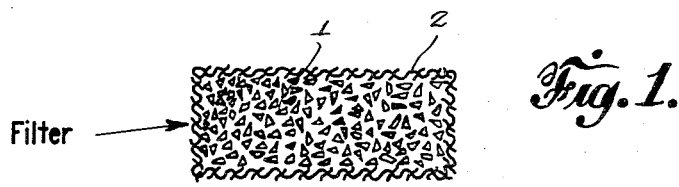

June 17, 1958  R. M. MILTON  2,839,065
FILTER FOR TOBACCO SMOKE
Filed May 21, 1956

INVENTOR.
ROBERT M. MILTON
BY
Jackson B. Browning
ATTORNEY

United States Patent Office 2,839,065
Patented June 17, 1958

2,839,065

FILTER FOR TOBACCO SMOKE

Robert M. Milton, Buffalo, N. Y., assignor to Union Carbide Corporation, a corporation of New York Application May 21, 1956, Serial No. 535,952

18 Claims. (Cl. 131—10)

This invention relates to filters for tobacco smoke and to smoking preparations.

It has long been known that smoke from tobacco combustion contains certain undesirable constituents. The objectionable nature of these constituents is evidenced by unpleasant taste, offensive odor, and an irritating effect upon mucous membrane of the nose and throat. The nature and extent of such irritation varies considerably from individual to individual but is believed to be present to some degree with all smokers.

Many attempts have been made to eliminate some, or all of the objectionable constituents in tobacco smoke. Treatment of tobacco prior to smoking is common practice. Filtration of the smoke by various physical and chemical means is also commonly employed.

It has generally been found that the methods presently available for smoke filtration result in a partial, if not a total, elimination of the pleasing taste and aroma in the smoke.

It is an object of the present invention to provide a suitable and satisfactory filter for tobacco smoke wherein removal of pleasant taste and aroma is minimized.

The object is achieved by employing activated crystalline zeolites as an adsorbent for objectionable constituents of tobacco smoke.

Zeolites are hydrated metal aluminum silicates which exist in either the crystalline or amorphous form. Only the crystalline zeolites which exhibit molecular sieve action and have the basic formula:

$$M_{\frac{2}{n}}O:Al_2O_3:XSiO_2:YH_2O$$

where "M" represents a metal and "n" its valence, are satisfactory for the purposes of this invention. In general, a particular crystalline zeolite will have values for X and Y that fall in a definite range. The value X for a particular zeolite will vary somewhat since the aluminum atoms and the silicon atoms occupy essentially equivalent positions in the crystal lattice.

Activation of the crystalline zeolites by heating to effect the loss of the water of hydration leaves a crystalline structure interlaced with channels of molecular dimensions offering very high surface area for the adsorption of foreign molecules.

Adsorption is limited to molecules having size and shape such as to permit entrance through the pores to the inner sorption area, all other molecules being excluded. The common adsorbents such as charcoal and silica gel do not exhibit molecular sieve action.

The pore size can be varied within limits, by replacement, in part or entirely, of the sodium cations with smaller or larger cations. Such ion exchange may be accomplished by conventional ion-exchange technique.

The molecular sieves have been found to have a high selectivity for polar and unsaturated compounds. It has been found that the selectivity of molecular sieves in their adsorption properties permits their use as improved filters for tobacco smoke. In the passage of the smoke through the filter, the aroma and flavor remain in the smoke stream in substantial strength, while the unpleasant constituents are minimized.

Of the many molecular sieve materials available for smoke filtration, synthetic zeolite X, described and claimed in copending patent application U. S. Serial No. 400,389, filed December 24, 1953, and synthetic zeolite A, described and claimed in copending patent application U. S. Serial No. 400,388, filed December 24, 1953 are recommended. These materials may be identified by the following chemical and physical data.

The general chemical formula for zeolite A may be written as follows:

$$1.0 \pm 0.2 M_{\frac{2}{n}}O:Al_2O_3:1.85 \pm 0.5 SiO_2:WH_2O$$

and for zeolite X as follows:

$$0.9 \pm 0.2 M_{\frac{2}{n}}O \cdot Al_2O_3:2.5 \pm 0.5 SiO_2:YH_2O$$

wherein "M" represents a metal, "n" its valence, "W" may be any value up to about 6 and "Y" may be any value up to about 8.

While it might appear that these materials are identical for some ranges of the composition, X-ray diffraction pattern data indicate that each of these materials is a crystallographic entity. The more significant values of the interplanar spacing for these materials, as determined from X-ray powder diffraction data are shown in Table I. Standard X-ray diffraction techniques were employed; radiation was the K alpha doublet of copper, and a Geiger counter spectrometer with a strip chart per recorder was used.

TABLE I

[d Value of reflection in A.]

| Zeolite A | Zeolite X |
|---|---|
| 12.2 ±0.2 | 14.42±0.2 |
| 8.6 ±0.2 | 8.82±0.1 |
| 7.05±0.15 | 4.41±0.05 |
| 4.07±0.08 | 3.80±0.05 |
| 3.68±0.07 | 3.33±0.05 |
| 3.38±0.06 | 2.88±0.05 |
| 3.26±0.06 | 2.79±0.05 |
| 2.96±0.05 | 2.66±0.05 |
| 2.73±0.05 | |
| 2.60±0.05 | |

Sodium zeolite X has been prepared by maintaining at about 100° C. until crystallization, sodium-aluminum-silicate-water mixtures, whose composition, expressed as oxide mixtures, fall within the following range:

$SiO_2/Al_2O_3$ from 3 to 5
$Na_2O/SiO_2$ from 1.2 to 1.5
$H_2O/Na_2O$ from 35 to 60 and separating the crystals of hydrated zeolite from the mother liquor.

Following the same procedure, sodium zeolite A has been prepared from mixtures whose compositions, expressed as mixtures of the oxides fall within the following range:

$SiO_2/Al_2O_3$ from 1.3 to 2.5
$Na_2O/SiO_2$ from 0.8 to 3.0
$H_2O/Na_2O$ from 35 to 200

The other cation-modifications of these zeolites may be obtained by the standard techniques of ion-exchange. The zeolites are contacted with an aqueous solution of a salt of the metal which is to be cation-exchanged with the sodium cations of the zeolites.

The zeolitic molecular sieves have been activated by heating them at about 400° C. so as to drive off a substantial amount of the water of hydration.

Zeolite A and zeolite X are described and claimed in patent applications Ser. Nos. 400,388 and 400,389, respectively.

Maximum effectiveness of tobacco smoke filtration is found when the molecular sieve employed is at least one of the zeolites in the group consisting of sodium zeolite X, sodium zeolite A and calcium zeolite A.

The filtering action of molecular sieves on tobacco smoke is demonstrated in the following examples.

*Example I*

The filter tip of 3¼-inch filter-tip cigarette was removed together with a small amount of tobacco adjacent to the filter tip. The tobacco was replaced with 0.2594 gram of 14/30 mesh Sodium A Molecular Sieve (described and claimed in copending application Ser. No. 400,388). This material was obtained by crushing 1/16-inch diameter clay-bonded pellets. The filter tip was replaced and the cigarette was smoked until its final length was 1.5 inches. A cigarette from the same package was also smoked until its final length was 1.5 inches. The filter tips were removed from both cigarettes and compared. The filter tip behind the molecular sieves underwent a distinct yellow tar discoloration along one-half of its length. The filter tip of the control cigarette became yellow throughout its entire length. Thus it can be seen that the small amount of molecular sieve employed as a filter successfully prevented the communication of the discoloring contaminant from reaching the lips and mouth of the smoker; the filter with no molecular sieve did not exhibit this desirable feature.

The molecular sieve increased in weight by 0.051 gram, or 19.7 weight percent, further evidence of its effectiveness as a filter.

*Example II*

The filter tip was removed from a 3¼-inch filter-tip cigarette together with a small amount of tobacco adjacent to the tip. The tobacco removed was replaced with approximately 0.5 gram of Sodium X Molecular Sieve (described and claimed in Ser. No. 400,389). This was 30/60 mesh material obtained from crushing 1/16-inch diameter clay-bonded pellets. The cigarette was smoked until its final length was 1.5 inches. The filter tip and the molecular sieve were then removed and examined. The filter tip was less discolored than either of the filter tips of Example I. The molecular sieve had undergone a marked discoloration, and an acrid odor of the adsorbate was immediately noted. The molecular sieve was subsequently placed in a flask and water was added. A brownish solution was formed which had a highly objectionable odor. Thus it is clearly shown that the molecular sieve adsorbs objectionable combustion products from tobacco smoke.

The molecular sieve adsorbent may be employed for smoke filtration in any one of many ways. The material may be mixed with the tobacco to provide a novel smoking preparation. It may be incorporated in a cigarette or cigar as a physical part of the smoking item. Or, it may be incorporated in a holder for tobacco such as a pipe, cigarette holder, or cigar holder. In any event, molecular sieve material must be contacted by the smoke before the smoke passes the smoker's lips.

Figure 2:
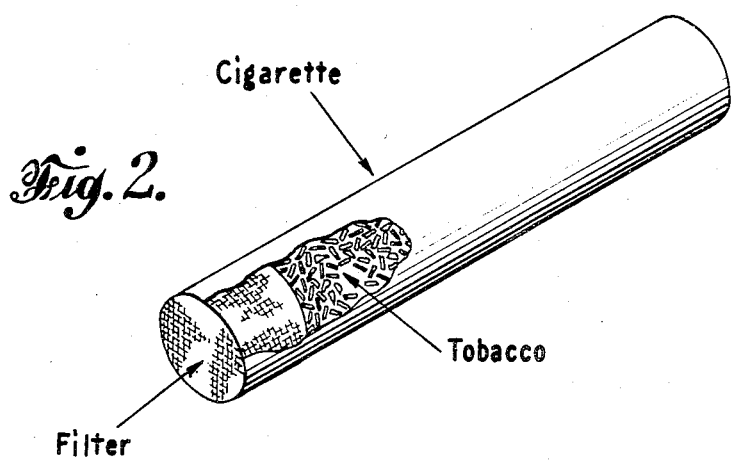
Figure 3:
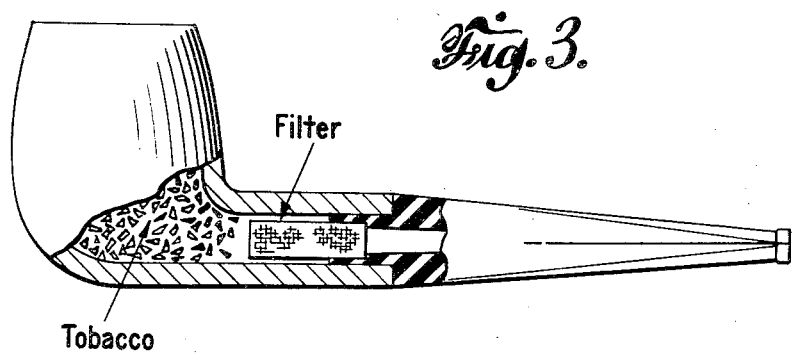

Figure 1 is a cross-section of a filter which is illustrative of the filters which may be employed in the present invention. Figure 2 illustrates a means by which the filters may be employed in a cigarette. Figure 3 is illustrative of a means for employing a filter in a pipe. In Figure 1, a crystalline molecular sieve 1 is shown retained in a porous material 2 such as cloth or porous paper. In Figure 2 such a filter is shown in situ. When the cigarette is smoked, the filter end is positioned between the smoker's lips. In Figure 3 the filter in the pipe is of the type shown in Figure 1 or of a similar type. The molecular sieve retainer may be modified by the use of other materials; the crystalline molecular sieve might be also included in other standard filtering media. As was previously noted, it is also possible to admix the crystalline molecular sieve with the tobacco to provide a smoking preparation.

What is claimed is:

1. A smoking preparation comprising tobacco and at least one activated crystalline molecular sieve.

2. A smoking preparation comprising tobacco and at least one activated synthetic crystalline molecular sieve selected from the group consisting of zeolite X and zeolite A.

3. A smoking preparation comprising tobacco and at least one activated synthetic crystalline molecular sieve selected from the group consisting of sodium zeolite X, sodium zeolite A and calcium zeolite A.

4. A cigarette comprising tobacco and at least one activated crystalline molecular sieve.

5. A cigarette comprising tobacco and at least one activated synthetic crystalline molecular sieve selected from the group consisting of zeolite X and zeolite A.

6. A cigarette comprising tobacco and at least one activated synthetic crystalline molecular sieve selected from the group consisting of sodium zeolite X, sodium zeolite A and calcium zeolite A.

7. A cigar comprising tobacco and at least one activated crystalline molecular sieve.

8. A cigar comprising tobacco and at least one activated synthetic crystalline molecular sieve selected from the group consisting of zeolite X and zeolite A.

9. A cigar comprising tobacco and at least one activated synthetic crystalline molecular sieve selected from the group consisting of sodium zeolite X, sodium zeolite A and calcium zeolite A.

10. A cigarette comprising tobacco and a tip containing a quantity of at least one activated crystalline molecular sieve.

11. A cigarette comprising tobacco and a tip containing a quantity of at least one activated synthetic crystalline molecular sieve selected from the group consisting of zeolite X and zeolite A.

12. A cigarette comprising tobacco and a tip containing a quantity of at least one activated synthetic crystalline molecular sieve selected from the group consisting of sodium zeolite X, sodium zeolite A and calcium zeolite A.

13. A cigar comprising tobacco and a tip containing a quantity of at least one activated crystalline molecular sieve.

14. A cigar comprising tobacco and a tip containing a quantity of at least one activated synthetic crystalline molecular sieve selected from the group consisting of zeolite X and zeolite A.

15. A cigar comprising tobacco and a tip containing a quantity of at least one activated synthetic crystalline molecular sieve selected from the group consisting of sodium zeolite X, sodium zeolite A and calcium zeolite A.

16. A smoke-filter for tobacco smoke comprising a holder for the article producing said smoke, said holder containing a quantity of at least one activated crystalline molecular sieve in the passage between said smoke-producing article and the smoker's lips.

17. A smoke-filter for tobacco smoke comprising a holder for the article producing said smoke, said holder containing a quantity of at least one activated synthetic crystalline molecular sieve selected from the group consisting of zeolite X and zeolite A in the passage between said smoke-producing article and the smoker's lips.

18. A smoke-filter for tobacco smoke comprising a holder for the article producing said smoke, said holder containing a quantity of at least one activated synthetic crystalline molecular sieve selected from the group consisting of sodium zeolite X, sodium zeolite A and calcium zeolite A in the passage between said smoke-producing article and the smoker's lips.

References Cited in the file of this patent

UNITED STATES PATENTS 2,739,598    Eirich  ---------------- May 4, 1953